United States Patent Office 2,915,558
Patented Dec. 1, 1959

2,915,558

PROCESS FOR THE SEPARATION OF DIISOPROPYLBENZENE DIHYDROPEROXIDES

Lucas Alders, Jan P. Fortuin, Hendrik Mondria, and Gerrit H. Reman, Amsterdam, Netherlands, assignors to Shell Development Company, New York, N.Y., a corporation of Delaware No Drawing. Application February 26, 1958
Serial No. 717,578

Claims priority, application Netherlands
February 28, 1957

8 Claims. (Cl. 260—610)

This invention relates to the separation of diisopropylbenzene dihydroperoxide from mixtures containing this compound in admixture with the corresponding monohydroperoxide and diisopropylbenzene. The invention relates more particularly to the recovery of diisopropylbenzene dihydroperoxide from diisopropylbenzene oxidation products containing diisopropylbenzene dihydroperoxide in admixture with uncoverted hydrocarbons and diisopropylbenzene monohydroperoxide.

Diisopropylbenzene dihydroperoxide is obtained by the oxidation of diisopropylbenzene with molecular oxygen. The oxidation product obtained generally contains the diisopropylbenzene dihydroperoxide in admixture with uncoverted diisopropylbenzene and oxidation products comprising substantial amounts of diisopropylbenzene monohydroperoxide. Production of the desired dihydroperoxide in a manner commensurate with practical-scale operation necessitates efficient recovering of the desired dihydroperoxide in high yields with a minimum of operative steps. Because of the nature of these compounds, methods heretofore disclosed directed to their treatment often entail the use of relatively complex operative procedures resulting in considerable loss of desired product as a result of the steps involved. Often such methods involve the use of conditions resulting in chemical reaction of the compounds to be separated with chemical treating agents thereby increasing still further the complexity of the operation and loss of desired product. Chemical separating means disclosed heretofore comprises treatment with non-acidic aqueous solutions having a pH value of more than 7, for example, with an aqueous NaOH-solution of 4% concentration. The diisopropylbenzene dihydroperoxide must then be recovered from the alkaline extract by an additional operation, for example, by acidifying with acid or $CO_2$, whereby the diisopropylbenzene dihydroperoxide precipitates. The drawback of this type of separation relying on aqueous alkaline solutions is that the hydroperoxide is not extracted as such, and can only be obtained by conversion of the resulting dihydroperoxide salt with acid or $CO_2$. A further disadvantage is that the stability of the diisopropylbenzene monohydroperoxide is adversely affected by the presence of aqueous alkaline solutions, and that a relatively high product loss is generally unavoidably encountered.

It has now been found that diisopropylbenzene dihydroperoxide can be recovered efficiently, with a minimum of operative steps, from mixtures containing this compound in admixture with diisopropylbenzene and diisopropylbenzene monohydroperoxide by means of a solvent extraction method wherein the above difficulties are obviated to at least a substantial degree.

In accordance with the invention diisopropylbenzene dihydroperoxide is separated in a high state of purity from mixtures comprising diisopropylbenzene dihydroperoxide in admixture with diisopropylbenzene monohydroperoxide and diisopropylbenzene by extracting said mixture at a temperature of from about 0° to about 100° C. with a non-alkaline, substantially neutral, aqueous solvent containing from 0 to about 80% by weight of an alkanol having not more than two carbon atoms to the molecule flowing countercurrent to a stream of normally liquid hydrocarbon solvent.

The process of the invention is applied to the recovery of diisopropylbenzene dihydroperoxide from mixtures containing the diisopropylbenzene dihydroperoxide in admixture with diisopropylbenzene monohydroperoxide and/or diisopropylbenzene obtained from any suitable source. It is applied with advantage to the recovery of diisopropylbenzene dihydroperoxide from oxidation products obtained by the hydroperoxidation of ortho-, meta-, or para-diisopropylbenzene or mixtures of these isomers. It is applied to the treatment of the diisopropylbenzene hydroperoxidation product as such or to fractions thereof. The process is applied with particular advantage to the recovery of the meta- and para-isomers of the diisopropylbenzene dihydroperoxide from the corresponding diisopropylbenzene monohydroperoxide in admixture with diisopropylbenzene.

In accordance with the process of the invention the aqueous solvent, containing from 0 to 80% by weight of an alkanol having not more than two carbon atoms, is passed through an extraction zone countercurrent to a normally liquid hydrocarbon solvent, and the diisopropylbenzene dihydroperoxide-containing mixture, containing the diisopropylbenzene dihydroperoxide in admixture with diisopropylbenzene monohydroperoxide and dissopropylbenzene, is introduced into the extraction zone at an intermediate point thereof between the points of introduction of the solvents. In the extraction zone there is formed a raffinate phase comprising diisopropylbenzene monohydroperoxide, diisopropylbenzene and hydrocarbon solvent saturated with aqueous solvent, and an extract phase comprising diisopropylbenzene dihydroperoxide, and aqueous solvent saturated with organic solvent. When feed and discharge rates are adjusted so that the extract phase is continuous, phase separation will occur in the part of the extraction zone remote from the point of introduction of the hydrocarbon solvent. Phase separation may be promoted by suitable means, such as the provision of a grid or the like, in this section of the extraction zone.

Extract phase comprising diisopropylbenzene dihydroperoxide and aqueous solvent and free of any substantial amount of diisopropylbenzene monohydroperoxide is withdrawn from the extraction zone at a point remote from the introduction of the aqueous solvent and passed to a suitable product separating zone such as, for example, a still. Within the still the extract phase is subjected to distillation to effect the separation of solvent consisting essentially of aqueous solvent, saturated with hydrocarbon solvent, from bottoms consisting essentially of diisopropylbenzene dihydroperoxide free of any substantial amount of diisopropylbenzene or diisopropylbenzene monohydroperoxide. The diisopropylbenzene dihydroperoxide thus recovered is taken from the distillation zone as a final product.

The raffinate phase comprising diisopropylbenzene monohydroperoxide, diisopropylbenzene and solvent is withdrawn from the extraction zone at a point remote from the point of introduction of the hydrocarbon solvent and passed to suitable product recovery means to effect the separation of solvent therefrom. Suitable means comprise, for example, a distillation operation wherein the solvent, consisting essentially of hydrocarbon solvent saturated with aqueous solvent, is separated as overhead from liquid bottom consisting essentially of diisopropylbenzene monohydroperoxide and diisopropylbenzene free of any substantial amount of diisopropylbenzene dihydroperoxide. The liquid bottoms consisting of diisopropylbenzene monohydroperoxide and diisopropylbenzene so obtained are withdrawn from the system as a final product or may be recycled to a diisopropylbenzene hydroperoxidation zone producing feed to be treated in the extraction process of the invention.

The distillation operations used to effect the separation of solvent from extract and/or raffinate phase may be carried out in any suitable type of distillation and/or fractional distillation type of operation, at sub-atmospheric or atmospheric or slightly super-atmospheric pressure. The use of a sub-atmospheric pressure is preferred. The separation of solvent from the extract and/or raffinate phases in accordance with the invention need not be effected by means of a distillation but may comprise instead, or additionally, one or more such steps as solvent extraction, extractive distillation, etc.

The solvent streams separated from the extract and raffinate phases of the extraction are passed to a suitable solvent separating zone wherein the organic solvent is separated by conventional means from the aqueous solvent admixed therewith. The solvent separation may comprise, for example, one or more such steps as for example stratification, distillation, etc. The aqueous solvent and the organic solvent thus recovered in a solvent separating zone are returned in separate streams to the appropriate point of their introduction into the extraction zone.

The extraction in accordance with the invention may be carried out continuously or discontinuously in any suitable type of equipment enabling contact of the material to be extracted with a countercurrent flow of the two solvents employed, comprising, for example, a system of mixers, separators or columns. Thus any suitable tower-type of apparatus enabling introduction of hydrocarbon solvent into the lower part thereof, aqueous solvent into the upper part thereof, and the diisopropylbenzene dihydroperoxide-containing feed to be treated into an intermediate part thereof, may suitably be employed. The extraction column may be packed with a suitable type of packing such as, for example, Rashig rings, or be provided with such means as baffles, trays, etc. A preferred tower type of apparatus for use in carrying out the invention comprises a rotating disc contactor as disclosed and claimed in U.S. Patent 2,601,674.

Although several combinations of solvents, heretofore employed in countercurrent extractions, might be expected to be suitable for the present extraction, it has been found that many of these combinations are unsuitable for the purpose envisaged in one or more respect. In addition to the requirement that the peroxide compounds should not appreciably decompose during the extraction step and the solvent recovery step, the most important condition to be fulfilled by the pair of solvents is that the distribution coefficients $k_d$ and $k_b$ of the diisopropylbenzene dihydroperoxide and the admixtures respectively in the aqueous and hydrocarbon solvent should be favorable.

By the distribution coefficient of a component of the feed is meant the ratio of the concentrations of this component in the extract and raffinate phase respectively at a single-stage extraction equilibrium. Both the absolute values of the distribution coefficient and the factor $k_d/k_b$, are important; as is known, the latter is a measure of the selectivity of a pair of solvents. The more the value of this factor varies from 1, the more selective will be the pair of solvents with respect to the components or groups of components of the mixture to be separated.

The non-alkaline, substantially neutral, aqueous solvents used in the process of the invention are the aqueous liquids containing from about 0 to about 80% by weight of an alkanol having not more than two carbon atoms per molecule, e.g., methanol and ethanol. It has been found that with a decreasing alkanol content the solvent power for the hydroperoxides decreases but that the selectivity for the separation of diisopropylbenzene dihydroperoxide from diisopropylbenzene monohydroperoxide simultaneously increases. At lower solvent power a higher ratio of aqueous solvent to feed mixture to be extracted is required. This may be wholly or partly offset by the use of a higher extraction temperature but below that at which the hydroperoxides decompose. The lower the alkanol content the higher will therefore generally be the extraction temperature; the ratio of aqueous solvent to feed mixture to be extracted remaining the same. If the aqueous solvent contains no alkanol (e.g., 100% water) extraction temperatures in the range of from about 50° to about 100° C., are preferred, temperatures in the range of from about 70° to about 90° C., being still more preferred. At about 15° to about 25° C. the optimum quantity of alkanol in the aqueous solvent lies in the range of from about 30 to about 60% by weight.

Despite certain advantages of operating at room temperature it may nevertheless be useful to employ an elevated extraction temperature and use water as the aqueous solvent since in this case an optimum selectivity is obtained and no alkanol need be recovered. As a result alkanol loss is avoided, and advantage can be taken of the fact that the feed mixture to be extracted generally is already at a temperature of from approximately 70° to 90° C. when emanating from a diisopropylbenzene oxidation reactor. In this case, it will, however, be necessary to use a higher ratio of aqueous solvent to mixture to be extracted.

The preferred alkanol for use in the aqueous solvent in accordance with the invention is methanol. The selectivity obtained with ethanol-water mixtures is somewhat less satisfactory than that obtained with methanol-water. When using ethanol-water mixtures as the aqueous solvent the ethanol content in the aqueous solvent is preferably below about 50% by weight.

Since it was believed heretofore that alcohols promote the decomposition of hydroperoxides (see Journ. Org. Chem., 1951, pp. 113–127) it was indeed surprising to find that no substantial decomposition of hydroperoxides is encountered under the conditions used in the process according to the invention.

The hydrocarbon solvent used in the extraction in accordance with the invention are normally liquid hydrocarbons. Since in a continuous oxidation of diisopropylbenzene, make-up diisopropylbenzene must be supplied to the oxidation, it would appear advantageous to use diisopropylbenzene as the hydrocarbon solvent. However a disadvantage of the use of diisopropylbenzene and, in fact, of aromatics in general, is their poor selectivity. Aliphatic hydrocarbons (including cyclo-aliphatic), in particular the saturated aliphatic hydrocarbons, are therefore preferably used. Particular preference is given to the alkanes and cyclo-alkanes having from five to seven carbon atoms per molecule.

If water only is used as the aqueous solvent a preferred weight ratio of water charged to mixture to be extracted is in the range of from about 20:1 to about 5:1, still more preferably 15:1 to about 10:1. If methanol-water mixtures containing from about 30 to about 60% by weight of methanol are used as the aqueous solvent at a temperature in the range of from 15° to 25° C. the weight ratio of the quantities of aqueous methanol charged to the mixture to be extracted is preferably maintained in the range of from about 10:1 to about 1:1, in particular from about 5:1 to about 2:1.

The quantity of hydrocarbon solvent used will generally be such that it is of approximately the same order of magnitude as that of the feed mixture; preferably in a ratio of hydrocarbon solvent to feed mixture in the range of from about ½:1 to about 2:1. Higher or lower relative amounts of the respective solvents may, however, be used within the scope of the invention.

The process according to the invention is applied with particular advantage in the continuous separation of meta-diisopropylbenzene dihydroperoxide from reaction mixtures obtained by hydroperoxidation of meta-diisopropylbenzene by means of an oxygen-containing gas, for example, with a view to the preparation of resorcinol.

Example I

A reaction mixture obtained by hydroperoxidation of meta-diisopropylbenzene containing 52.5% by weight of meta-diisopropylbenzene monohydroperoxide and 15.6% by weight of meta-diisopropylbenzene dihydroperoxide, the rest of the mixture consisting essentially of diisopropylbenzene, was subjected to batchwise countercurrent solvent extraction at 20° C. in apparatus having a capacity of 7 theoretical stages. The solvents employed were a mixture of methanol and water (weight ratio of methanol to water of 50:50) and hexane. A total of 20 grams of hexane, 30 grams of the methanol-water mixture and 10 grams of the oxidation reaction mixture were charged to the extraction. The two solvents were passed countercurrently from opposing ends through the system and the oxidation reaction mixture was introduced at a point between points of introduction of the solvents. When the stationary state had been reached the quantity of mono- and dihydroperoxide of meta-diisopropylbenzene in the final extract was found to consist of 92.5% by weight of diisopropylbenzene dihydroperoxide and 7.5% by weight of diisopropylbenzene monohydroperoxide. It was also found that 84% by weight of the diisopropylbenzene dihydroperoxide charged in the reaction mixture had been extracted and that 99% by weight of the diisopropylbenzene monohydroperoxide originally present had not been extracted.

From this it can be calculated that the ratio in distribution coefficients of diisopropylbenzene dihydroperoxide and diisopropylbenzene monohydroperoxide was approximately 5:1.

Example II 30 parts by weight of an aqueous solution containing 50% by weight of methanol and saturated at 20° C. with n-hexane were introduced per minute at a temperature of 20° C. into the first stage, viz. into the upper part, of a rotating disc contactor type of extraction column, having a capacity of six theoretical extracting stages and five theoretical washing stages above and below the feed inlet, respectively. 18 parts by weight of n-hexane (saturated with aqueous methanol) were introduced per minute into the 10th stage of the lower part of the column, and 10 parts by weight of an oxidation reaction mixture into the sixth stage. The oxidation reaction mixture contained 15.6% by weight meta-diisopropylbenzene dihydroperoxide and 52.5% by weight meta-diisopropylbenzene monohydroperoxide, the rest consisted essentially of diisopropylbenzene.

Distillation under reduced pressure of the extract phase withdrawn from the extraction column in a quantity of 31.9 parts by weight per minute yielded 1.65 parts by weight per minute of a 93.1% by weight pure meta-diisopropylbenezene dihydroperoxide. The raffinate phase (26.1 parts by weight per minute) was freed of ethane solvent by distillation under reduced pressure. The resultant raffinate was recycled to the oxidation reactor in which the charge was being produced. 98% by weight of the quantity of diisopropylbenzene dihydroperoxide present in the feed was extracted and only approximately 1% by weight of the diisopropylbenzene monohydroperoxide present in the feed was entrained in the extract phase.

Example III (A) 10 parts by weight of water, 1 part by weight of meta-diisopropylbenzene (as organic solvent) and 1 part by weight of the reaction mixture feed to the extraction in Example I, were added together at 80° C. with shaking until the phase equilibrium was reached. The distribution coefficients at that temperature were determined by means of infrared analysis of the phases obtained. For the diisopropylbenzene dihydroperoxide this coefficient was approximately 0.14, for the diisopropylbenzene monohydroperoxide approximately 0.01; $k_d/k_b$=approximately 14.

(B) 153 grams of water, 10.39 grams of meta-diisopropylbenzene and 10.30 grams of the same reaction mixture used in (A) above were shaken together for three hours at 80° C. The quantity of extract phase obtained was 153.51 grams, the quantity of hydrocarbon phase, 20.18 grams. The peroxide number of the hydrocarbon phase (determined by iodometric titration) was 176. The aqueous phase was washed three times with 6 grams of meta-diisopropylbenzene. After it has been found that the extract phase of the third washing no longer yielded a peroxide number, the extract phases of the first and second washing were combined. The amount of hydrocarbon extract thus obtained weighed 12.82 grams and had a peroxide number of 40. The peroxide number of the reaction mixture was 407. The peroxide balance was therefore as follows:

Reaction mixture 10.3 ×4.07= 41.92 mmol
Aqueous phase 12.82×0.40= 5.13 mmol
Hydrocarbon phase 20.18×1.76=35.52 mmol −40.65 mmol
                                    ─────────
                                    Shortage 1.27 mmol In a duplication of this experiment in which the starting materials were 153 grams of water, 10.61 grams of meta-diisopropylbenzene and 10.62 grams of the above-mentioned reaction mixture, a peroxide balance was obtained showing a surplus of 1.12 mmol.

Since the shortage and surplus found are within the experimental margins of error, it may be concluded from the foregoing that there was no decomposition of peroxide during the test.

The invention claimed is:

1. The process for separating diisopropylbenzene dihydroperoxide from a mixture comprising said diisopropylbenzene dihydroperoxide in admixture with diisopropylbenzene monohydroperoxide and diisopropylbenzene, which comprises extracting said mixture at a temperature of from about 15° to about 25° C. with an aqueous solvent consisting essentially of water containing from 30 to 60% by weight of an alkanol having from one to two carbon atoms to the molecule flowing countercurrent to a stream of normally liquid hydrocarbon solvent, thereby forming an extract phase consisting essentially of diisopropylbenzene dihydroperoxide and aqueous solvent and a raffinate phase consisting essentially of diisopropylbenzene monohydroperoxide, diisopropylbenzene and hydrocarbon solvent, and separating diisopropylbenzene dihydroperoxide from said extract phase.

2. The process for separating diisopropylbenzene dihydroperoxide from a mixture comprising said diisopropylbenzene dihydroperoxide in admixture with diisopropylbenzene monohydroperoxide and diisopropylbenzene, which comprises extracting said mixture at a temperature of from about 15° to about 25° C. with an aqueous solvent consisting essentially of water containing from 30 to 60% by weight of an alkanol having from one to two carbon atoms to the molecule flowing countercurrent to a stream of alkanes having from five to seven carbon atoms to the molecule, thereby forming an extract phase consisting essentially of diisopropylbenzene dihydroperoxide and aqueous solvent and a raffinate phase consisting essentially of diisopropylbenzene monohydroperoxide, diisopropylbenzene and hydrocarbon solvent, and separating diisopropylbenzene dihydroperoxide from said extract phase.

3. The process in accordance with claim 2 wherein said stream of alkanes consists essentially of hexane.

4. The process in accordance with claim 2 wherein said diisopropylbenzene dihydroperoxide, diisopropylbenzene monohydroperoxide and diisopropylbenzene are the meta-isomers.

5. The process for separating diisopropylbenzene dihydroperoxide from a mixture containing said diisopropylbenzene dihydroperoxide in admixture with diisopropylbenzene monohydroperoxide and diisopropylbenzene, which comprises extracting said mixture at a temperature of from about 0° to about 50° C. with an aqueous solvent consisting essentially of aqueous methanol containing from about 30 to about 60% by weight of methanol flowing countercurrent to a stream of hydrocarbon solvent consisting essentially of alkanes having from five to seven carbon atoms to the molecule, thereby forming an extract phase consisting essentially of diisopropylbenzene dihydroperoxide and aqueous solvent and a raffinate phase consisting essentially of diisopropylbenzene monohydroperoxide, diisopropylbenzene and hydrocarbon solvent, and separating diisopropylbenzene dihydroperoxide from said extract phase.

6. The process in accordance with claim 5 wherein said extraction is executed at a temperature of from about 15° to about 25° C.

7. The process in accordance with claim 6 wherein said hydrocarbon solvent consists essentially of hexane.

8. The process in accordance with claim 7 wherein said diisopropylbenzene dihydroperoxide, diisopropylbenzene monohydroperoxide and diisopropylbenzene are the meta-isomers.

References Cited in the file of this patent

UNITED STATES PATENTS 2,812,357    Webster et al. _____ Nov. 5, 1957